US009646170B2

(12) United States Patent
Kurian et al.

(10) Patent No.: US 9,646,170 B2
(45) Date of Patent: *May 9, 2017

(54) SECURE ENDPOINT FILE EXPORT IN A BUSINESS ENVIRONMENT

(71) Applicant: Bank of America Corporation, Charlotte, NC (US)

(72) Inventors: Manu Jacob Kurian, St. Louis, MO (US); Sorin N. Cismas, Addison, TX (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/016,158

(22) Filed: Feb. 4, 2016

(65) Prior Publication Data
US 2016/0154968 A1 Jun. 2, 2016

Related U.S. Application Data

(63) Continuation of application No. 14/480,969, filed on Sep. 9, 2014, now Pat. No. 9,378,384, which is a
(Continued)

(51) Int. Cl.
G06F 17/30 (2006.01)
G06F 21/62 (2013.01)
G06F 21/60 (2013.01)

(52) U.S. Cl.
CPC ........ *G06F 21/6218* (2013.01); *G06F 21/604* (2013.01); *G06F 21/62* (2013.01);
(Continued)

(58) Field of Classification Search
CPC ...... G06F 21/123; G06F 21/335; G06F 21/35; G06F 21/45; G06F 21/77; G06F 21/78;
(Continued)

(56) References Cited

U.S. PATENT DOCUMENTS 5,657,388 A  8/1997 Weiss
6,701,349 B1  3/2004 Cromer et al.
(Continued)

FOREIGN PATENT DOCUMENTS

WO  2008092031 A2  7/2008

OTHER PUBLICATIONS

Itani et al., "Policy-based security channels for protecting network communication in mobile cloud computing," Security and Cryptography (SECRYPT), 2011 Proceedings of the International Conference on Year: 2011 pp. 450-456.
(Continued)

*Primary Examiner* — Hosuk Song
(74) *Attorney, Agent, or Firm* — Michael A. Springs; Moore & Van Allen PLLC; W. Kevin Ransom

(57) ABSTRACT

Embodiments for preventing data loss in a business environment are provided. In some embodiments, a secure endpoint file export application assigns users to different classes having different permissions for accessing and writing data. In an embodiment, the system and method are configured to identify a plurality of users in a business environment; classify the plurality of users according to business needs; assign the users to one of at least two classes based on the classification; determine that the first user is permitted to access the data; transmit the secure file to a second user who is permitted to write the data in the secure file to removable media; write the data in the secure file to the removable media; and track a location of the removable media.

14 Claims, 8 Drawing Sheets

Related U.S. Application Data continuation-in-part of application No. 14/267,152, filed on May 1, 2014.

(60) Provisional application No. 61/980,132, filed on Apr. 16, 2014.

(52) U.S. Cl.
CPC .. *G06F 21/6209* (2013.01); *G06F 2221/2101* (2013.01); *G06F 2221/2115* (2013.01); *G06F 2221/2141* (2013.01)

(58) Field of Classification Search
CPC ............... G06F 21/604; G06F 21/6209; G06F 2221/2101; G06F 2221/2115; G06F 21/2141; H04L 63/10; H04L 63/101
USPC ............................ 726/26–30; 713/189, 193
See application file for complete search history.

(56) References Cited

U.S. PATENT DOCUMENTS

| | | | |
|---|---|---|---|
| 7,640,582 B2 | 12/2009 | Beck | |
| 7,669,051 B2* | 2/2010 | Redlich | C07K 14/70575 713/166 |
| 7,913,311 B2 | 3/2011 | Alain et al. | |
| 7,962,582 B2* | 6/2011 | Potti | G06F 8/67 370/229 |
| 8,060,862 B2* | 11/2011 | Eldridge | G05B 15/02 700/86 |
| 8,127,149 B1 | 2/2012 | Nachenberg | |
| 8,272,028 B2* | 9/2012 | Motoyama | H04L 63/10 726/1 |
| 8,302,206 B2 | 10/2012 | Yabe | |
| 8,544,058 B2* | 9/2013 | Lim | G06F 17/3089 713/156 |
| 9,378,384 B2* | 6/2016 | Kurian | G06F 21/604 |
| 2004/0221118 A1 | 11/2004 | Slater et al. | |
| 2006/0095470 A1 | 5/2006 | Cochran | |
| 2008/0126543 A1 | 5/2008 | Hamada et al. | |
| 2010/0122313 A1 | 5/2010 | Ivgi | |
| 2010/0306269 A1 | 12/2010 | Osmond | |
| 2012/0233656 A1 | 9/2012 | Rieschick et al. | |
| 2013/0047219 A1 | 2/2013 | Shahbazi | |
| 2013/0067600 A1 | 3/2013 | Graham et al. | |
| 2013/0124529 A1 | 5/2013 | Jacob | |
| 2013/0226975 A1 | 8/2013 | Lee | |
| 2013/0290464 A1 | 10/2013 | Barrall et al. | |
| 2014/0026182 A1 | 1/2014 | Pearl et al. | |
| 2014/0059700 A1 | 2/2014 | Kiriyama et al. | |
| 2014/0115623 A1 | 4/2014 | Rajgopal et al. | |
| 2014/0130180 A1 | 5/2014 | Balasubramanyan et al. | |
| 2015/0154968 A1* | 6/2015 | Kastner | G10L 19/008 704/500 |

OTHER PUBLICATIONS

Zhou et al., "A distributed application-oriented development framework based on resource management," Distributed Computing Systems, 2001. FTDCS 2001. Proceedings. The Eighth IEEE Workshop on Future Trends of Year: 2001 pp. 83-88.

Ioannis Papagiannis, Peter Pietzuch; "CloudFilter: Practical Control of Sensitive Data Propagation to the Cloud"; Oct. 2012; CCSW '12: Proceedings of the 2012 ACM Workshop on Cloud computing security workshop; Publisher: ACM; pp. 97-102.

* cited by examiner

SECURE ENDPOINT FILE EXPORT IN A BUSINESS ENVIRONMENT

CLAIM OF PRIORITY UNDER 35 U.S.C. §119

This non-provisional U.S. patent application is a continuation of U.S. non-provisional patent application Ser. No. 14/480,969, entitled "SECURE ENDPOINT FILE EXPORT IN A BUSINESS ENVIRONMENT" filed on Sep. 9, 2014, assigned to the assignee herein, which is a continuation-in-part of U.S. non-provisional patent application Ser. No. 14/267,152, entitled "SECURE DATA ACCESS" filed May 1, 2014, assigned to the assignee herein, which claims priority to U.S. provisional patent application No. 61/980,132, entitled "SECURE DATA ACCESS" filed Apr. 16, 2014, assigned to the assignee hereof, all of which are hereby expressly incorporated by reference herein.

BACKGROUND

Typical data loss prevention processes tend to take an "all or nothing" approach. Either users are given full access to read, copy, and modify targeted data or the users are prevented from accessing the targeted data entirely Although the systems running these processes may keep data logs, selective permission to access and/or write files is not permitted. As a result, creators or owners of files do not have control over the file once the file is shared or made public. Thus, there is a need for a system and method for providing selective access and write ability to data in a business environment.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

In some embodiments, the system is designed to provide enhanced security in a business environment by selectively permitting access and/or write privileges to different individuals. By separating access from write ability, greater security for data is achieved. The system is operated via a secure endpoint file export application that tracks individuals, data, and secure data containers to provide active monitoring of data. In this manner, the system provides for a pro-active security system that defines access and actions for specific users in advance. The system is an improvement over prior art system in that the disclosed system prevents unauthorized sharing before it occurs rather than tracking unauthorized sharing after the fact.

In a first aspect, a system, computer program product, and method for preventing data loss in a business environment is provided. In some embodiments, a secure endpoint file export application assigns users to different classes having different permissions for accessing and writing data. The system, computer program product, and method may be configured to identify a plurality of users in a business environment; classify the plurality of users according to business needs; assign the users to one of at least two classes based on the classification, wherein class A permits users to access the data but not write the data to removable media, and wherein class B permits users to write the data to removable media but not access the data; determine that a first user is attempting to access data on a secure file; determine that the first user is permitted to access the data on the secure file by comparing the identity of the user to a database comprising the plurality of users in the business environment and their respective classes; transmit the secure file to a second user who is permitted to write the data in the secure file to removable media; write the data in the secure file to the removable media; and track a location of the removable media.

In some embodiments, the system, computer program product, and method are further configured to identify the first user based on a login used to access a computing device. In an embodiment, the system, computer program product, and method are further configured to monitor the plurality of users logged into the secure endpoint file export application; and assign the users to a class as the users logged into the secure endpoint file export application change. In one embodiment, the system, computer program product, and method are further configured to determine a predetermined schedule for writing the data to the removable media; and send the data from the first user to the second user based upon the predetermined schedule.

Tracking the removable media may include receiving a wireless signal from the removable media, and tracking the location of the removable media based on the wireless signal. In some embodiments, the system, computer program product, and method are further configured to monitor the location of the removable media; and erase the removable media if a condition is met, wherein the condition is selected from the group consisting of a predetermined period of time outside a predetermined radius from a permitted location, detection of unauthorized access to the removable media, and receiving instructions from the secure endpoint file export application to erase the removable media. In a still further embodiment, the classes comprise a third class that permits both access to the data and the ability to write the data to the removable media.

Other aspects and features, as recited by the claims, will become apparent to those skilled in the art upon review of the following non-limited detailed description of the invention in conjunction with the accompanying figures.

BRIEF DESCRIPTION OF THE SEVERAL VIEWS OF THE DRAWINGS

The present embodiments are further described in the detailed description which follows in reference to the noted plurality of drawings by way of non-limiting examples of the present embodiments in which like reference numerals represent similar parts throughout the several views of the drawings and wherein.

DETAILED DESCRIPTION

Figure 1A:
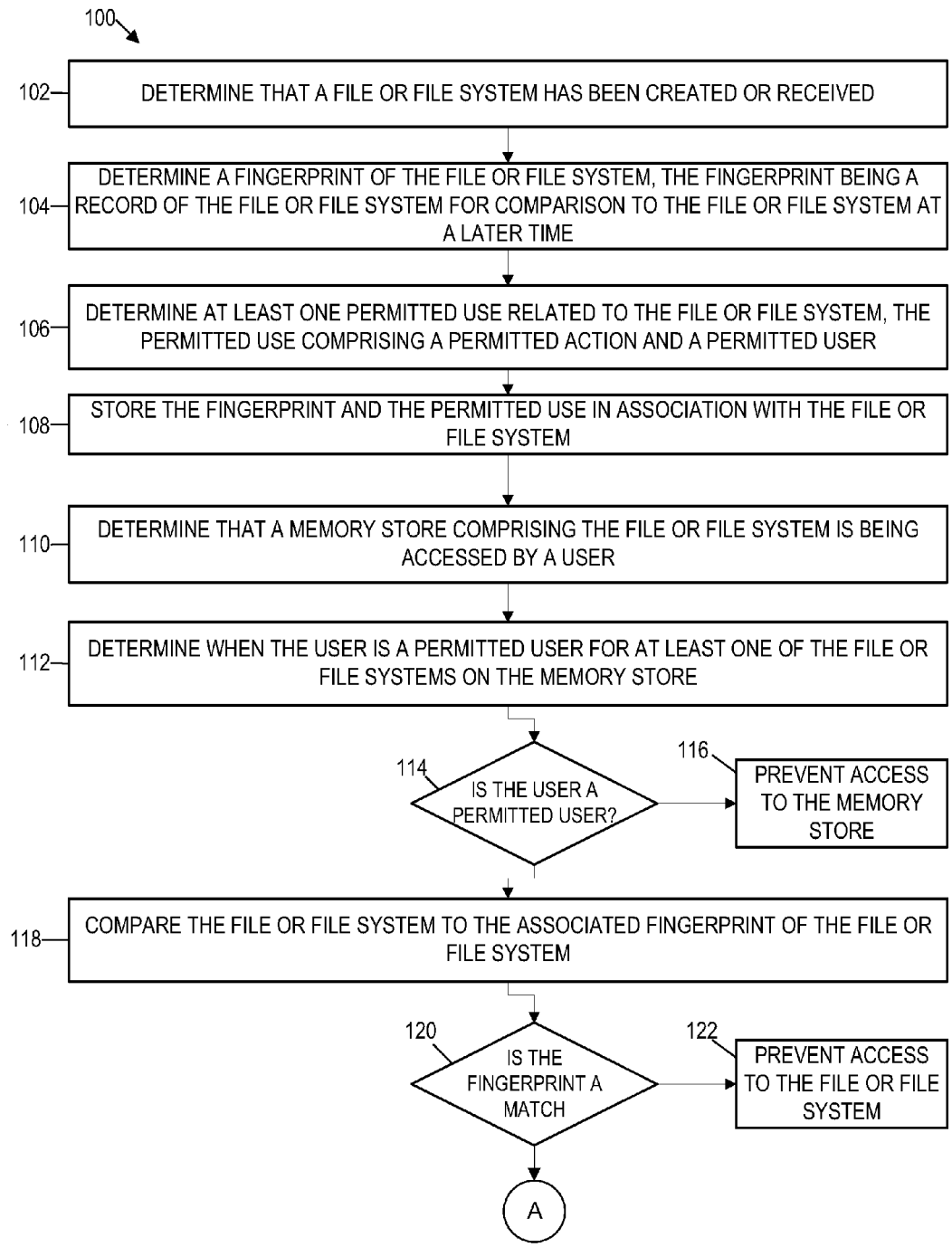
FIGS. 1A and 1B are a flowchart illustrating a system and method for providing a secure access file system in accordance with the embodiments presented herein.

The embodiments presented herein are directed to systems, methods, and computer program products for preventing data loss through selective data access.

The embodiments of the disclosure may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present embodiments of the disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present embodiments of the disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present embodiments of the disclosure are described below with reference to flowchart illustrations and/or block diagrams of methods, apparatus (systems) and computer program products according to embodiments of the embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Secure Data Access

Figure 1B:
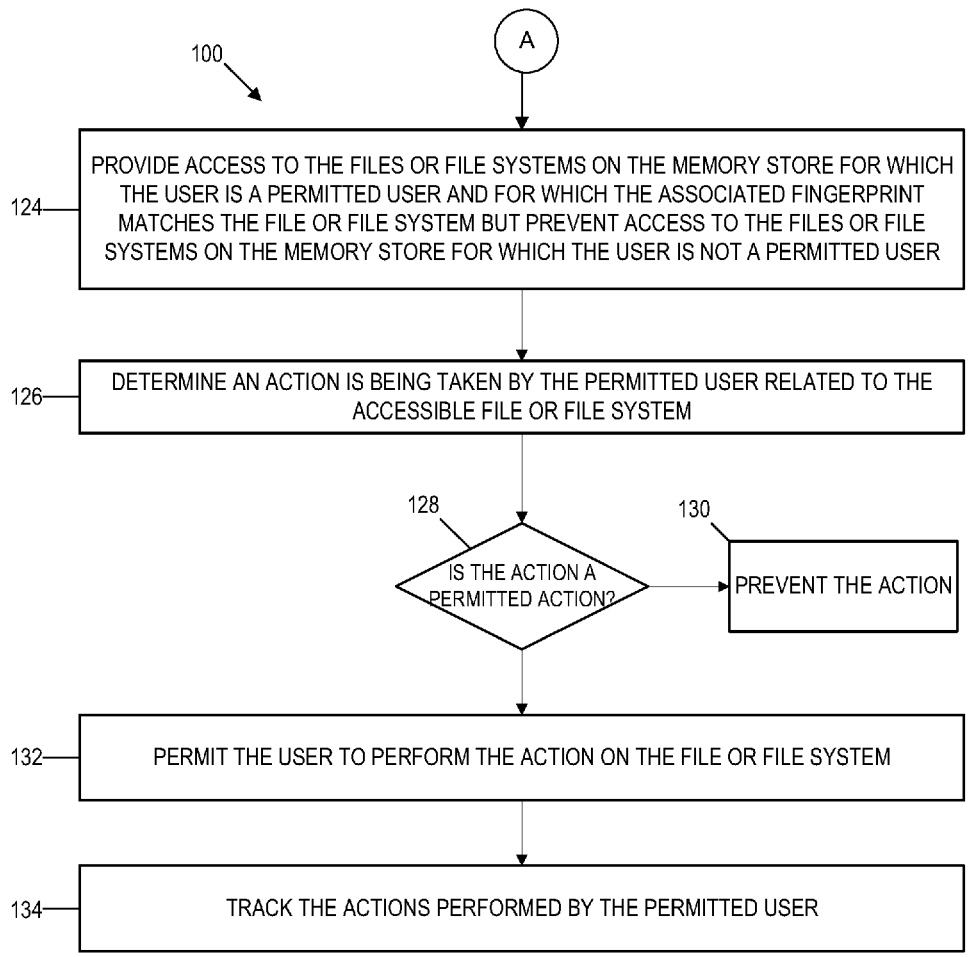

Referring now to the figures, in FIG. 1 a system and method of providing secure data access is provided in accordance with some embodiments of this disclosure. In some embodiments, the system and method are configured to determine that a file has been created or received; determine a fingerprint of the file, wherein the fingerprint is a record of the file for comparison to the file at a later time; and determine at least one permitted use related to the file, wherein the permitted uses comprises a permitted user and a permitted action. These actions occur pro-actively and define selective permissions for one or more users in contrast to the all-or-nothing approach of prior art systems. In an embodiment, the system stores the fingerprint and the permitted use in association with the file, such as locally or on a network. In some embodiments, the system determines that the file is being accessed by a user; determines whether the user is a permitted user of the file based on an identity of the user; compares the file to the associated fingerprint of the file when the user is a permitted user; and determines the action being taken by the user when the file matches the associated fingerprint. In this manner, the system confirms that the user is authorized, that the action is permitted, and that file being acted upon is the proper version. At this point, the system will permit the action to occur when the action is a permitted action of the file.

Turning now to block 102, the system determines that a file or file system has been created or received. As used herein, a file is a collection of data organized as part of a computer system. For example, a file may be a document, a spreadsheet, a presentation, a database, an audio or video file, a text file, a file specific to an application, or the like. One skilled in the art would understand that many different types of files are possible and the examples disclosed herein are merely exemplary. The file typically has a single name or identifier under which the data may be accessed. A file system is a plurality of files or a virtual container under which a plurality of files is organized. While the word "file" may be used herein, the word "file" may be interchanged with the phrase "file system" throughout this disclosure.

In an embodiment, the file is created by a user, a program, an operating system, or the like. For example, a user may generate a report that is stored as a document. The user creates the file through use of a program. In another embodiment, the file is automatically generated as part of a program. For example, a computer program may create a log of activities on a computer. In still another embodiment, the file is a component of the operating system and or a program associated with the operating system. A printer driver may be an example of a file that is a component of an operating system. Files may be created when initiated generated and saved or may be created when a new version of the file is saved.

In some embodiments, the file is received from a user, an external source, or a server on a network. For example, a user may be working with a file and decide to enter the file into the system disclosed herein. The user may input the file, email the file, or otherwise indicate that the file is to be treated by the system disclosed herein. In some embodiments, the file is received from an external source. For example, a file may be sent to the financial institution via a USB drive or emailed to the institution. In some embodiments, the file is stored on a server connected to the system via a network, such as a wireless or wired network.

In an embodiment, the system receives the file when the file is indicated as entered into the system. Some files may be not managed via the system, i.e., the steps of the method are not performed on all files associated with the financial institution. The file may require a positive entry into the system in order for the steps to be performed on the file. In some embodiments, all files or all files of a specific type are automatically entered into the system and a user must opt out for the file to not be entered into the system. For example, for a small enough institution, all files created may be entered into the system. For a larger system, all files of a specific type, e.g., all generated document files, may be automatically entered into the system.

In block 104, the system determines a fingerprint of the file or file system. In some embodiments, the fingerprint is a record of the file or file system for comparison to the file or file system at a later time. The fingerprint is an electronic record that stores information on the structure, content, and/or communication channels associated with the file. For example, the fingerprint may be similar to a database schema, which is a mathematical description of a database that permits comparison of the database with other databases. In some embodiments, the fingerprint is a copy of the file, e.g., a copy of the document, at a certain point in time, e.g., when the fingerprint is made. In some embodiments, the copy is compared to the original to determine whether any changes have been made between the copy and the original. In some embodiments, the fingerprint is updated each time a permitted action is performed on the file.

In an embodiment, the comparison is carried out by a computing device processor. The comparison may evaluate any one of or all of the structure, the content, and the communication channels of the file. The structure of the file is the data structure comprising the file. For example, the number of columns or rows in a spreadsheet may be part of the structure of the spreadsheet. The content of the file is the data input into the file. The information in cells of the spreadsheet or the words and figures in a document are the content of the file. The communication channels are the connections between the file and external elements. For example, if a spreadsheet is automatically updated via an input interface, the connection to the input interface may be a part of the comparison. In some embodiments, a checksum calculation is used to determine whether the fingerprint is identical to the file.

As will be discussed in greater detail later, the fingerprint is used at a later time to make a comparison to a file being accessed or used at the later time. The comparison permits the financial institution to ensure that the file being accessed is the file for which permission to access was granted. The fingerprint comparison prevents files from being shared outside the financial institution if the file has not been reviewed and approved for external share. Small changes to the file may result in the comparison identifying differences and preventing the file from being accessed or shared. As should be understood, the acceptable level of difference between the fingerprint and the file may be adjusted by a user to reduce the number of times a change in the file is identified.

In block 106, the system determines at least one permitted use related to the file or file system. In some embodiments, the permitted use includes a permitted action and a permitted user. The system disclosed herein differs from prior art systems in that the system is a permission-based system that approves actions and users in advance. In contrast, prior art systems conduct a forensic process that logs access but evaluates shares after the share has occurred. In the embodiments disclosed herein, the system determines a permitted use in advance so that the file may be accessed only be permitted users and the file may be used only via permitted actions.

As used herein, a permitted action is a use of the file that is permitted by the system. For example, writing data to the file may be a permitted action. Editing data on a file, deleting data on a file, copying a file, sharing a file, establishing connections between the file and external sources, moving the file, viewing the file, and the like are all examples of actions that may be permitted actions. It should be understood that other actions, e.g., playing an audio file, may be permitted actions and that the list disclosed herein is merely exemplary.

As used herein, a permitted user is a user that is permitted to perform a permitted action on the file. The permitted user may be an employee of the financial institution or an external employee. In an embodiment, the permitted user is identified by means of a username and password. In some embodiments, entry codes, hardware identifiers, or the like are used to identify the permitted user.

In an embodiment, a system administrator, developer, reviewer, compliance officer, or the like will evaluate a file and determine which actions are permitted actions and/or which users are permitted users. In an embodiment, the system provides a default list of actions for the file or based on the file type. In some embodiments, the system scans the file for keywords or data types, e.g., social security numbers, account numbers, or the like, and automatically assigns permitted actions and/or permitted users that may be changed by the user. In some embodiments, the system requires additional approval to specify a permitted user from outside the financial institution.

In block 108, the system stores the fingerprint and the permitted use in association with the file or file system. The fingerprint and the permitted use are stored in association with the file or file system so that the fingerprint and the permitted use may be evaluated when the file is accessed or used. In some embodiments, this means that the fingerprint and the permitted use are stored locally with the file. In some embodiments, the fingerprint and the permitted use are stored on a network and accessed when the file is accessed or used. In this embodiment, the file may not be accessible if the network is not available and the fingerprint and the permitted use cannot be evaluated.

In block 110, the system determines that a memory store comprising the file or file system is being accessed by a user. As used herein, memory store may be a hardware or software embodiment of memory that stores the file. For example, the memory store may be a partition on a hard drive that stores the file. The user may be accessing a folder in a directory structure of a computer in order to access the file. In some embodiments, the memory store is a virtual container that has access protections, as will be discussed in greater detail in regard to FIGS. 3 and 4. In another example, the memory store is a hardware device such as a USB drive or the like.

A user may be a representative of the financial institution or an external party. In some embodiments, the system is used to ensure that external users are permitted to view or access only files that have been pre-approved and checked for version consistency prior to access. In some embodiments, the user is an automated or on-demand computer process. For example, an application may initiate program code that causes the computer to copy the file to a network location, e.g., a cloud server. The system disclosed herein may evaluate the application to determine whether the application is a "permitted user" (as well whether the copying is a permitted action and the fingerprint of the file matches).

In some embodiments, "accessing" means that some portion of the file is viewable by the user. For example, seeing the name of the file means that the file is being accessed. In this example, opening a folder or directory structure that includes the file is accessing the file. In some embodiments, "accessing" means that the user is attempting to open the file. For example, the user is opening the file to read the contents of a document. "Accessing" may also mean copying the file, editing the file, or the like. In some embodiments, the definition of "accessing" may be specified by a user when the permitted use is defined.

In an embodiment, the system determines that the user is accessing the file based on evaluation of the user's actions via a computing device processor. The system may determine that calls to the system have been initiated and that a request to open the file, view the file, or the like has been made.

In block 112, the system determines when the user is a permitted user for at least one of the file or file systems on the memory store. In an embodiment, the system determines whether the user is a permitted user by identifying the user and comparing the identity of the user to a list of permitted users. In an embodiment, the list of permitted users is stored in association, e.g., locally or on a network, with the file.

In an embodiment, the system determines that the user is a permitted user by evaluating the identity of the user. The identity of the user may be determined from a user login, a passcode, or the like. The list of permitted users may be present in a database that is accessed by the system. In some embodiments, the permitted users are at least one user that has been granted at least one permitted action with respect to the file. In some embodiments, the system evaluates the memory store to identify all files protected by the disclosed system and identify the permitted users for each of the files.

In decision block 114, the system determines whether the user is a permitted user. As discussed, the system may determine this based on evaluation of a permitted or allowed users list. In block 116, the system prevents access to the memory store if the user is not a permitted user for the file or file system. In some embodiments, preventing access means that the user is not able to open the memory store. In other embodiments, preventing access means that the user is able to open the memory store but not able to view the file for which the user is not a permitted user. In still further embodiments, the user is able to view the file in the memory store but not able to conduct an action on the file, e.g., open the file, copy the file, delete the file, or the like.

In block 118, the system compares the file or file system to the associated fingerprint of the file or file system when the user is a permitted user of the file. This step ensures that while the user may be a permitted user for the file, the system is also confirming that the file has not changed since the user became a permitted user. In an embodiment, the system compares the file that is being accessed with the fingerprint of the file that is stored in association with, e.g., locally or on a network, the file. As discussed, the system compares the file via a computing device processor. In some embodiments, a checksum is created to determine whether the file and the fingerprint are a match based on the structure, the content, and/or the communication channels associated with the file.

In decision block 120, the system determines whether the fingerprint is a match. A match may mean an identical match in all areas that the system is evaluating, e.g., structure, content, communication channels. In some embodiments, a text comparison is performed to identify changes such as updates, new versions, edits, or deletions to the content of the file. In some embodiments, specific portions of the files are excluded from the analysis. For example, portions or metadata related to files may be excluded if these portions typically change without changing content. For example, current date or time may be recorded in the metadata when a file is accessed but this data does not indicate that the file changed from the time the fingerprint was created. In some embodiments, the match is within a specific level of similarity, e.g., 100% similarity, 99% similarity, 95% similarity, or the like. Algorithms for comparing files and determining levels of similarity or difference may be used.

In block 122, the system prevents access to the file or file system when the fingerprint is not a match. If the file does not match the fingerprint within the specified level, e.g., 100%, 95%, and the like, the system prevents access to the file. The user may not be able to open the memory store comprising the file, view the file in the memory store, and/or open the file in the memory store.

In block 124, the system provides access to the files or file systems on the memory store for which the user is a permitted user and for which the associated fingerprint matches the file or file system. In some embodiments, the system also prevents access to the files or file systems on the memory store for which the user is not a permitted user or the associated fingerprint does not match the file or file system.

In block 126, the system determines an action is being taken by the permitted user related to the accessible file or file system. For example, the user may be attempting to open the file, write to the file, copy the file, move the file, delete the file, or the like. As discussed, there are many variations of actions taken because file types covered by this disclosure differ. Updating a database or playing a music file may be permitted actions for specific types of files.

In some embodiments, the action is being taken when the user attempts to initiate the action via a command input into the computer system. For example, double clicking on a file may be a command to open the file. The user may activate additional software that will copy, delete, or scan the file, thereby taken action on the file. An automated script that accesses a file is also taking action on the file. The determination of when an action is being taken may be dependent upon the type of file, as well.

In decision block 128, the system determines whether the action is a permitted action. In an embodiment, the system compares the action being taken to a list of permitted actions associated with the file. For example, the system may store a list of permitted action by permitted user for each file in a database that is accessed by the system when an action is being taken on a file protected by the system. In block 130, the system prevents the action when the action is not a permitted action. In an embodiment, an error message is displayed indicating why the action is prevented from occurring.

In block 132, the system permits the user to perform the action on the file or file system when the action is a permitted action. In an embodiment, the system does not prevent whatever action is being taken from being completed. For example, another program may open the file. Edits to the file may be saved. The file may be deleted, or the like. Based on this process, if an action is permitted then the user has permission to access the file, the file matches the fingerprint of the file stored in association with the file, and the action being taken is a permitted action for the file (and in some embodiments based on the user). In an embodiment, the system automatically updates the fingerprint when a permitted action is performed on a file.

In block 134, the system tracks the actions performed by the permitted user. In an embodiment, the system not only provides a front end selective permission system but also tracks actions performed or attempted by users. For example, the system may track all of the actions performed by permitted users and/or track the actions that are prevented either because the user is not a permitted user, the fingerprint does not match, or the action is not a permitted action. In some embodiments, the system also tracks the data passing out of the secure file or secure container.

In some embodiments, the system and method are used to provide secure data access. For example, the system may be used to provide protection to files or file systems whereby the file is prevented from unauthorized sharing or other actions. The system also confirms that the file that is being shared is the file that approval was provided for. In this way, the system ensures that the action taken is permitted and the file being acted upon is the proper version for sharing. The system and method improves upon the forensic nature of prior art methods, which may track sharing but only identify problems with sharing after the fact. It should be understood that additional steps in the process may be performed while complying with the disclosure herein.

Environment for Providing Secure Data Access

Figure 2:
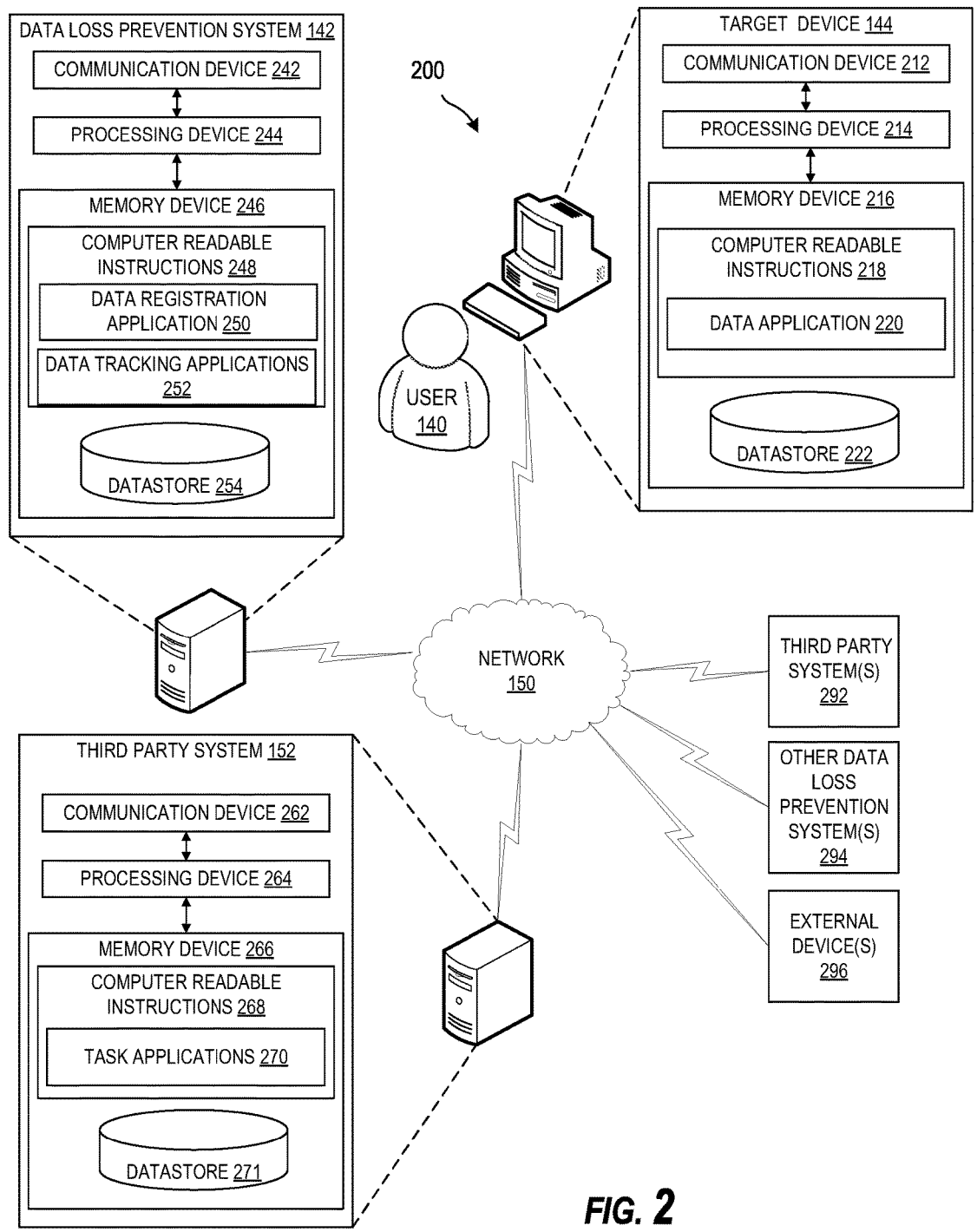
FIG. 2 provides a block diagram illustrating a data loss prevention system, a third party system, and a target device, in accordance with various embodiments.

Referring now to FIG. 2, a block diagram illustrates an environment 200 for providing secure data access. The environment 200 includes a target device 144, a data loss prevention system 142, and a third party system or device 152. The user 140 is associated with the target device 144 and can include an owner of the device 144, parties that have authorized access to the device 144, an employee, associate, and the like. The target device 144 can include any type of device such as an ATM, a computing device, a mobile device, and so forth. The third party system 152 can include a system associated with a developer, technical support team, or a vendor. The environment 200 further includes one or more other third party systems 292 (e.g., a partner, agent, or contractor associated with the data loss prevention system 142), one or more other data loss prevention systems 294, and one or more external devices 296 (e.g., USB flash drives, hard drives, and other removable media). The systems and devices communicate with one another over the network 150 and perform one or more of the various steps and/or methods according to embodiments of the disclosure discussed herein.

The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet.

The target device 144, the third party system 152, and the data loss prevention system 142 each includes a computer system, server, multiple computer systems and/or servers or the like. The data loss prevention system 142, in the embodiments shown has a communication device 242 communicably coupled with a processing device 244, which is also communicably coupled with a memory device 246. The processing device 244 is configured to control the communication device 242 such that the data loss prevention system 142 communicates across the network 150 with one or more other systems. The processing device 244 is also configured to access the memory device 246 in order to read the computer readable instructions 248, which in some embodiments includes registration applications 250 and data tracking applications 252. The data registration application 250 may be configured to approve a file or container in the target device 144, and generate a fingerprint for the file or container. The data tracking application 252 may monitor access and actions to files and containers associated with the target device 144. The memory device 246 also includes a datastore 254 or database for storing pieces of data that can be accessed by the processing device 244, such as permitted users or permitted actions associated with files or containers.

As used herein, a "processing device," generally refers to a device or combination of devices having circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 214, 244, or 264 may further include functionality to operate one or more software programs based on computer-executable program code thereof, which may be stored in a memory. As the phrase is used herein, a processing device 214, 244, or 264 may be "configured to" perform a certain function in a variety of ways, including, for example, by having one or more general-purpose circuits perform the function by executing particular computer-executable program code embodied in computer-readable medium, and/or by having one or more application-specific circuits perform the function.

As used herein, a "memory device" generally refers to a device or combination of devices that store one or more forms of computer-readable media and/or computer-executable program code/instructions. Computer-readable media is defined in greater detail below. For example, in one embodiment, the memory device 246 includes any computer memory that provides an actual or virtual space to temporarily or permanently store data and/or commands provided to the processing device 244 when it carries out its functions described herein.

The target device 144 includes a communication device 212 and communicably coupled with a processing device 214, which is also communicably coupled with a memory device 216. The processing device 214 is configured to control the communication device 212 such that the target device 144 communicates across the network 150 with one or more other systems. The processing device 214 is also configured to access the memory device 216 in order to read the computer readable instructions 218, which in some embodiments includes a data application 220 for running specific programs. The memory device 216 also includes a datastore 222 or database for storing pieces of data that can be accessed by the processing device 214.

The third party system 152 includes a communication device 262 communicably coupled with a processing device 264, which is also communicably coupled with a memory device 266. The processing device 264 is configured to control the communication device 262 such that the third party system 152 communicates across the network 150 with one or more other systems. The processing device 264 is also configured to access the memory device 266 in order to read the computer readable instructions 268, which in some embodiments include task applications 270 for performing various tasks such as debugging, troubleshooting, and so forth. The memory device 266 also includes a datastore 271 or database for storing pieces of data that can be accessed by the processing device 264.

In some embodiments, the data application 220 and the task applications 270 interact with the registration applications 250 and the data tracking applications 252 to receive and process registration requests, register and pre-approve data, provide containers, monitor data, and the like.

The applications 220, 250, 252, and 270 are for instructing the processing devices 214, 244 and 264 to perform various steps of the methods discussed herein, and/or other steps and/or similar steps. In various embodiments, one or more of the applications 220, 250, 252, and 270 are included in the computer readable instructions stored in a memory device of one or more systems or devices other than the systems 152 and 142 and the target device 144. For example, in some embodiments, the application 220 is stored and configured for being accessed by a processing device of one or more third party systems 292 connected to the network 150. In various embodiments, the applications 220, 250, 252, and 270 stored and executed by different systems/devices are different. In some embodiments, the applications 220, 250, 252, and 270 stored and executed by different systems may be similar and may be configured to communicate with one another, and in some embodiments, the applications 220, 250, 252, and 270 may be considered to be working together as a singular application despite being stored and executed on different systems.

In various embodiments, one of the systems discussed above, such as the data loss prevention system 142, is more than one system and the various components of the system are not collocated, and in various embodiments, there are multiple components performing the functions indicated herein as a single device. For example, in one embodiment, multiple processing devices perform the functions of the processing device 244 of the data loss prevention system 142 described herein. In various embodiments, the data loss prevention system 142 includes one or more of the external systems 296 and/or any other system or component used in conjunction with or to perform any of the method steps discussed herein. For example, the data loss prevention system 142 may include a financial institution system, an information technology system, and the like.

In various embodiments, the data loss prevention system 142, the third party system 152, and the target device 144 and/or other systems may perform all or part of a one or more method steps discussed above and/or other method steps in association with the method steps discussed herein. Furthermore, some or all the systems/devices discussed here, in association with other systems or without association with other systems, in association with steps being performed manually or without steps being performed manually, may perform one or more of the steps of method 100, the other methods discussed below, or other methods, processes or steps discussed herein or not discussed herein.

Method of Creating Secure Data Containers

Figure 3:
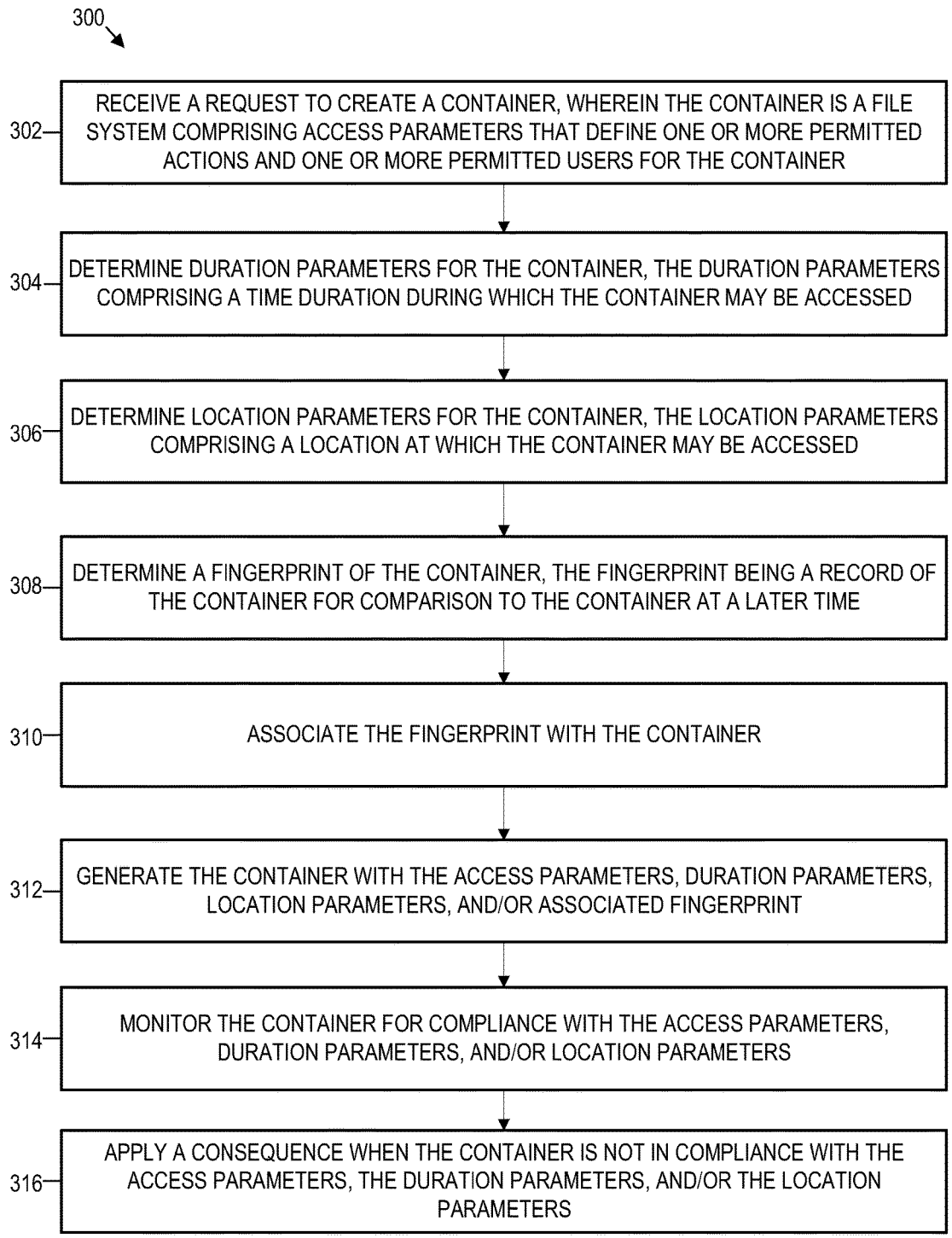
FIG. 3 is a flowchart illustrating a system and method for creating a virtual container for use in a secure access file system in accordance with various embodiments.

Turning now to FIG. 3, a system and method is provided for creating secure data containers, wherein the system provides a virtual container providing selective access to and selective actions regarding files stored in the virtual container. In some embodiments, the system is configured to receive a request to create a container, wherein the container is a file system comprising access parameters that define one or more permitted actions and one or more permitted users for the container. The system then determines duration parameters for the container, wherein the duration parameter comprise a time duration during which the container may be accessed, and determines a fingerprint of the container, the fingerprint being a record of the container for comparison to the container at a later time. In some embodiments, the system then generates the container with the access parameters, duration parameters, and fingerprint; monitors the container for compliance with the access parameters, duration parameters, and fingerprint; and applies a consequence when the container is not in compliance with the access parameters, duration parameters, or fingerprint. The consequence may range from preventing access to the container or file to automatically deleting the container or file.

In block 302, the system receives a request to create a container. In some embodiments, the container is a file system comprising access parameters that define one or more permitted actions and one or more permitted users for the container. In an embodiment, the file system may be a single file stored in memory. In this embodiment, the single file may have access parameters, duration parameters, location parameters, and the like. While this disclosure will refer to file systems with respect to containers or virtual containers, it should be understood that a single file may be considered a container.

In an embodiment, a container is a virtual memory store that is configured to contain one or more files. In some embodiments, the container may be created empty and configured to receive files that are saved or copied to the container. In some embodiments, the container is created around pre-existing files in order to provide additional security for the files. In some embodiments, the container is created to protect the memory store of a removable storage device, such as a USB drive.

In an embodiment, the container is a file system that is configured to receive one or more files. In some embodiments, the file system is encrypted and requires encryption technology in order to access or read. In some embodiments, the file system is locked via a password. In some embodiments, the file system is compressed and must be uncompressed prior to access.

In some embodiments, the container includes access parameters instead of or in addition to the encryption, passwords, and/or compression. In an embodiment, access parameters are parameters set up in advance that determine access to the container by permitted users and determine permitted actions that may be taken with respect to the container or to files stored within the container.

In an embodiment, a permitted user is a user that is permitted to access the container and/or at least one file stored in the container. As discussed with respect to FIG. 1, the permitted user may be an individual or a program. The individual may be associated with the financial institution, e.g., an employee, or the individual may be external to the financial institution. The permitted user or users may be stored in a database associated with the container or files stored in the container.

Permitted actions, as discussed with respect to FIG. 1, may be any type of action take on the files or container. For example, access to the container may be a permitted action. In some embodiments, the permitted actions are tied to a specific permitted user. In other embodiments, the permitted actions may be performed by any permitted user. While the examples of permitted actions related to files may be applied to the container as well, it should be understood that additional actions may be performed on containers. For example, a container may be deleted, including all of the contents in the container. In some embodiments, permitted actions for containers relate to coordinated action on the files in the container. For example, a permitted action may permit a plurality of files in the container to be searched or indexed at one time.

In an embodiment, the access parameters are determined when the request is received. For example, a user may specify that a container having specific access parameters, i.e., one or more permitted users and one or more permitted actions, be created. In some embodiments, the access parameters are default parameters for the container or for all containers. In some embodiments, when the container is created around pre-existing files the access parameters may be determined at least in part based on characteristics of the pre-existing files. For example, a container created around video files may control what types of applications may play the video files, or with him the video files may be shared.

In an embodiment, the system receives the request via a computing device processor. For example, the request may be received over a network or via an input device. In some embodiments, a user inputs the request and either defines the parameters or is prompted to enter the parameters by the system. In some embodiments, the request is received to create container without any files stored in the container. In other embodiments, the request is received along with one or more files that will be stored within the container. In some embodiments, the request is received when external storage devices, e.g., USB drives, are input into a computer or server.

In block 304, the system determines a duration parameter for the container. In some embodiments, the duration parameter includes a time duration during which the container may be accessed. In some embodiments, a container is created for a limited time period, such as one week, one month, or the like. In an embodiment, the time duration is the length of time from the creation of the container until the container is no longer accessible to at least one permitted user. In some embodiments, the time duration is the time from creation until the container is no longer accessible to any user. In some embodiments, the time duration starts running from a time different from the creation of the container. For example, the time duration may start running from the time the container is accessed by any user or by a specific permitted user. In further embodiments, the time duration may run from the time a user attempts to access the container but is prevented from doing so for some reason. In an embodiment, a permitted user may reset the time duration if the permitted user provides an input to the container within the time duration. In this manner, if a container is lost and a non-permitted user attempts to access the container, the container will not be accessible after the predetermined time period. In some embodiments, the container is set up to automatically erase the contents of the container at the end of the time duration.

In an embodiment, the duration parameter is received in a manner similar to the access parameters. For example, the duration parameter may be received from a user, may be a default time duration, or may be dependent at least in part on the content of the container. The duration parameter may be applied to the container when the container is created or may be applied at a later date. In some embodiments, different duration parameters apply to different files stored in the container. In an embodiment, the container may have a first duration parameter and the files stored in the container may have duration parameters.

In block 306, the system determines a location parameter for the container. In some embodiments, the location parameter includes a location at which the container may be accessed. Similar to the duration parameters, the location parameter is a predetermined geographic area in which the container or one or more files stored in the container may be accessed by a permitted user. In some embodiments, the container is erased when the system determines that the container is located outside of the location parameters. In some embodiments, one or more files are not accessible outside of a predetermined area. The location parameters permit the user to protect files so that the files are not accessed outside of predefined areas.

In some embodiments, the location of the container or files stored in the container is determined based on a positioning system device associated with the memory store. For example, a GPS unit may be associated with the memory store. The system uses a computing device processor to determine the location. In some embodiments, the system determines the location when the container or device is accessed to determine the current location of the device comprising the container.

In block 308, the system determines a fingerprint of the container. In an embodiment, the fingerprint is a record of the container for comparison to the container at a later time. As discussed herein, the fingerprint may include information on the structure, content, or communication channels of the container and/or the files stores in the container. The system determines the fingerprint using a computing device processor, as discussed with regard to FIG. 1. The fingerprints associated with files may be individually assessed or assessed as a whole with the fingerprint of the container.

In block 310, the system associates the fingerprint with the container. In some embodiments, the fingerprint is stored locally with the container or in a network associated with the container. In some embodiments, the fingerprint is stored inside the container. The system may update the fingerprint of the container anytime that the container or any file in the container is changed based on a permitted action.

In block 312, the system generates the container with the access parameters, duration parameters, location parameters, and/or associated fingerprint. In some embodiments, a computing device processor generates the container with the access parameters, duration parameters, location parameters, and/or associated fingerprint. The computing device processor may install the container on a removable drive, such as a USB drive. In some embodiments, the container is generated and specific files are input into the container upon generation.

In block 314, the system monitors the container for compliance with the access parameters, duration parameters, and/or location parameters. In an embodiment, compliance means that the information associated with the container complies with the parameters defined for the container. For example, the location of the container may be monitored and compared to the location parameters. In some embodiments, the parameters, e.g., access, duration, location, and fingerprint, are continually monitored. In some embodiments, the parameters are only monitored when the container or a file in the container is accessed or when the container or a file in the container is acted upon.

In block 316, the system applies a consequence when the container is not in compliance with the access parameters, the duration parameters, and/or the location parameters. In an embodiment, a consequence is an action taken by the system when the container is not in compliance with at least one of the parameters. The consequences may differ based on the parameter that is not in compliance. For example, an access parameter that is not in compliance—e.g., the container is somehow accessed by a non-permitted user—may cause the file or container to be immediately erased. In another example, a container that is outside of a location parameter boundary may merely not be opened until the container is back within the location parameter. The consequences may be user-defined or default.

The method of creating a secure container disclosed herein provides a method for protecting files or file systems stored in virtual containers. The method may be used to provide additional protection to files, such as access protections, duration protections, and location protections. Other types of protection parameters may also be included in the general disclosure provided herein. For example, time parameters may permit access to containers only during specified times of the day. The method also provides for determining a fingerprint of the container or the files contained therein and comparing the container or files to the fingerprint to ensure that the action is being performed on the correct version. The container provides an additional layer of protection and may be combined with hardware-level protection as well as file-level protection to provide additional security around sensitive data.

Method of Using Secure Data Containers

Figure 4:
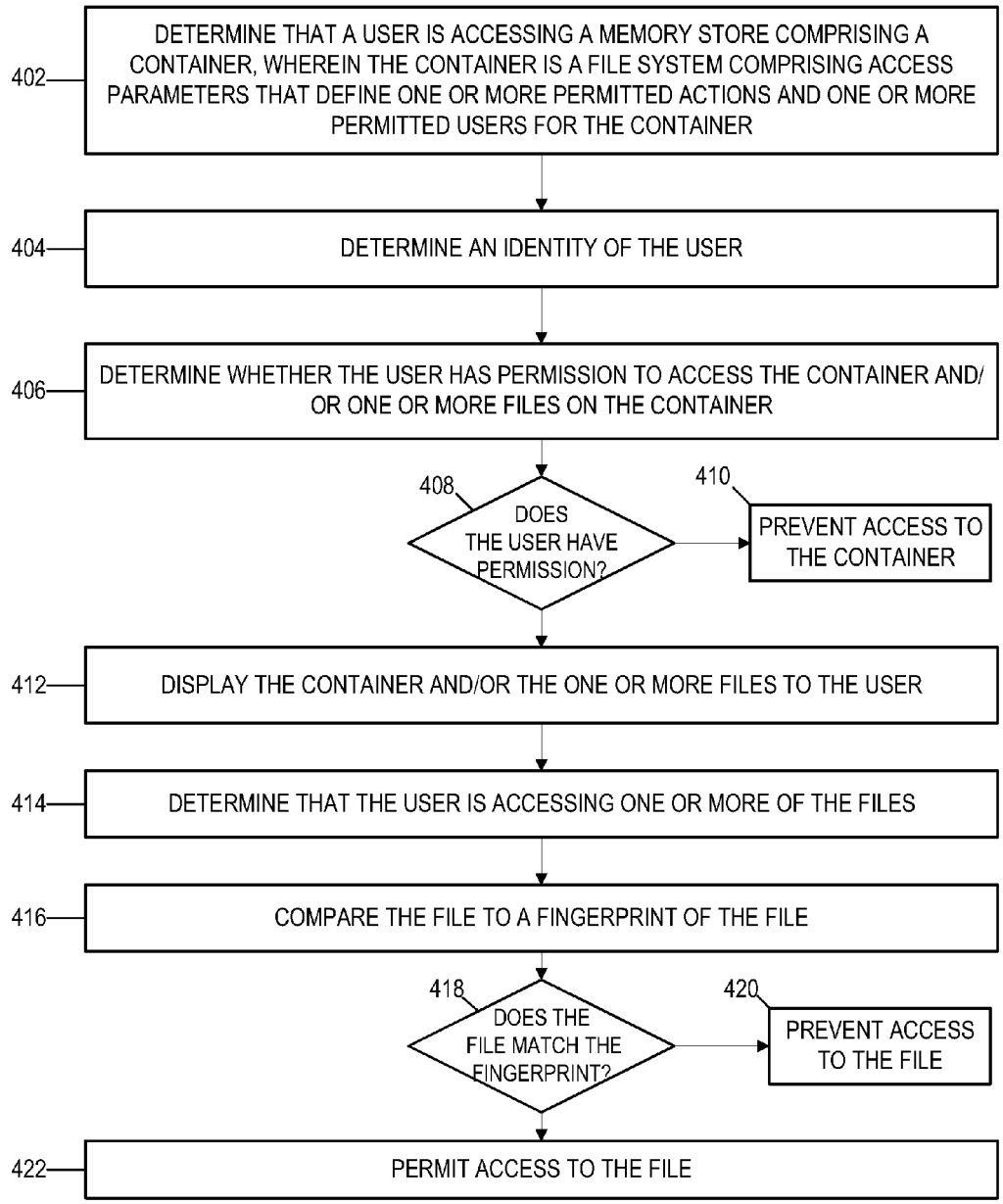
FIG. 4 is a flowchart illustrating a system and method for using a virtual container with a secure access file system in accordance with various embodiments.

Turning now to FIG. 4, a system and method of using the secure data containers of FIG. 3 is provided. In some embodiments, the use of secure data containers is to permit selective access by individuals that do not have permission to create the secure data containers. For example, a user may be needed to transport and share files in a removable storage device, but the user does not require access to the content of the files. Use of the secure data containers permits an administrator to establish a secure data container that contains the files and selective permissions that allows the secondary user to share the files in the container but not to access the files in the container. Other examples of selective permissions are possible based on the disclosure provided herein.

In block 402, the system determines that a user is accessing a memory store comprising a container. In some embodiments, the container is a file system comprising access parameters that define one or more permitted actions and one or more permitted users for the container. As discussed, a user may be an individual associated with the financial institution or an individual external to the financial institution. In some embodiments, the user is a program or computing device that accesses the container automatically or upon request of a user.

In some embodiments, the memory store is a portion of a drive, a partition, or the like of memory in which the container is stored. In some embodiments, the memory store is identified as a portion of the memory based on a directory structure. In further embodiments, the memory store is memory associated with a removable device, such as a USB drive, a memory chip, or the like.

In block 404, the system determines an identity of the user. The identity of the user may be determined from a user login, a passcode, or the like. In some embodiments, the identity of the user is determined based on a hardware number associated with hardware of the user. In some embodiments, a network address is used to identify the user up to a specific level, e.g., the network address indicates that the user is accessing the container from within the financial institution. In some embodiments, a portion of the identifier is used to provide access. For example, a ".gov" suffix on an email address may identify the user such that the user is accessing the container from a government account.

In block 406, the system determines whether the user has permission to access the container and/or one or more files on the container. In an embodiment, the system compares the identity of the user to the access parameters associated with the container to determine if the user is a permitted user. In some embodiments, the system compares the identity of the user to an allowed list of permitted users available to the system in a database.

In decision block 408, the system determines whether the user has permission. In block 410, the system prevents access to the container when the user does not have permission. Preventing access may mean that the container is hidden from view. In some embodiments, preventing access means that the container is visible but the user cannot review the contents of the container. In still further embodiments, the system erases the container in order to prevent access.

In block 412, the system displays the container and/or the one or more files to the user when the user is allowed to access the container. The user may be able to open the container and view the files listed in the container. In an embodiment, the user is able to view the containers is a directory structure or folder format. In some embodiments, metadata relating to the files are also available, such as creation date, size, creator, last access date, or the like. In some embodiments, the user may be able to access the container but not able to view the contents of the files in the container.

In block 414, the system determines that the user is accessing one or more of the files. As discussed herein, accessing may depend on the type of file. For example, a database may be accessed when a communication channel is opened to the database. In another example, a document is accessed when the document is opened, copied, moved, or the like. The system determines that the user is accessing the one or more files based upon a command initiated by the user related to the file, e.g., open, copy, and the like.

In block 416, the system compares the file to a fingerprint of the file. The fingerprint of the file is created when the file is most recently changed by a permitted action. The fingerprint is stored in association with the file, such as in the container, locally to the memory store, or on a network accessible to the container. As discussed, the system compares the file via a computing device processor. In some embodiments, a checksum is created to determine whether the file and the fingerprint are a match based on the structure, the content, and/or the communication channels associated with the file. In an embodiment, the comparison is carried out by a computing device processor. The comparison may evaluate any one of or all of the structure, the content, and the communication channels of the file. The structure of the file is the data structure comprising the file. For example, the number of columns or rows in a spreadsheet may be part of the structure of the spreadsheet. The content of the file is the data input into the file. The information in cells of the spreadsheet or the words and figures in a document are the content of the file. The communication channels are the connections between the file and external elements. For example, if a spreadsheet is automatically updated via an input interface, the connection to the input interface may be a part of the comparison. In some embodiments, a checksum calculation is used to determine whether the fingerprint is identical to the file or is similar to the file within a predetermined level of confidence, e.g., 99% or 95%. In further embodiments, dynamic data associated with the file is not included in the comparison. In other embodiments, however, the file is a static file.

In decision block 418, the system determines whether the file matches the fingerprint. A match may mean an identical match in all areas that the system is evaluating, e.g., structure, content, communication channels. In some embodiments, a text comparison is performed to identify changes such as updates, new versions, edits, or deletions to the content of the file. In some embodiments, specific portions of the files are excluded from the analysis. For example, portions or metadata related to files may be excluded if these portions typically change without changing content. For example, current date or time may be recorded in the metadata when a file is accessed but this data does not indicate that the file changed from the time the fingerprint was created. In some embodiments, the match is within a specific level of similarity, e.g., 100% similarity, 99% similarity, 95% similarity, or the like. Algorithms for comparing files and determining levels of similarity or difference may be used.

In block 420, the system prevents access to the file when the file does not match the fingerprint. As with the container in general, the system may not allow the user to perform an action on the file if the fingerprint does not match. For example, the user may not send the file to an external party if the fingerprint does not match. This prevents the user from sending a different version of the file to an external party as opposed to the version that was pre-approved for dissemination.

In block 422, the system permits access to the file when the file matches the fingerprint. If the user has access and the fingerprint matches the file, the user may be able to access the file. As discussed in FIG. 1, when a user accesses a file the user may be able to perform all actions on the file or the system may have a list of permitted actions that the user may perform on the file. In one use case, a user may be able to access a USB drive and copy files from the USB drive onto a remote drive, e.g., an ATM, but the user does not have permission to read the content on the drive. In some embodiments, the container may be remote wiped by an authorized user. For example, if the container is accessible to a network the user may remotely erase the files in the container if the user is a permitted user and remote erase is a permitted action for the user.

The method of using secure containers is related to the method of creating secure containers. Rather than providing container parameters and establishing the container, the method of using describes a system and method whereby the container actively protects files from unauthorized access and unauthorized actions, and compares the file to the fingerprint to ensure that the proper version is being acted upon. The container may also implement parameters related to access, such as duration, location, encryption, compression, and the like. The method of using describes how the secure container may be used to provide additional security to sensitive data.

Secure Access to Programming Data

The process embodiments discussed hereinabove largely describe data transfers for end users such as employees, associates, or other users who may need to transfer files or other data. In the embodiments described below with regard to FIG. 5, I/O and/or OS codes associated with certain tasks are transferred between devices or systems.

Figure 5:
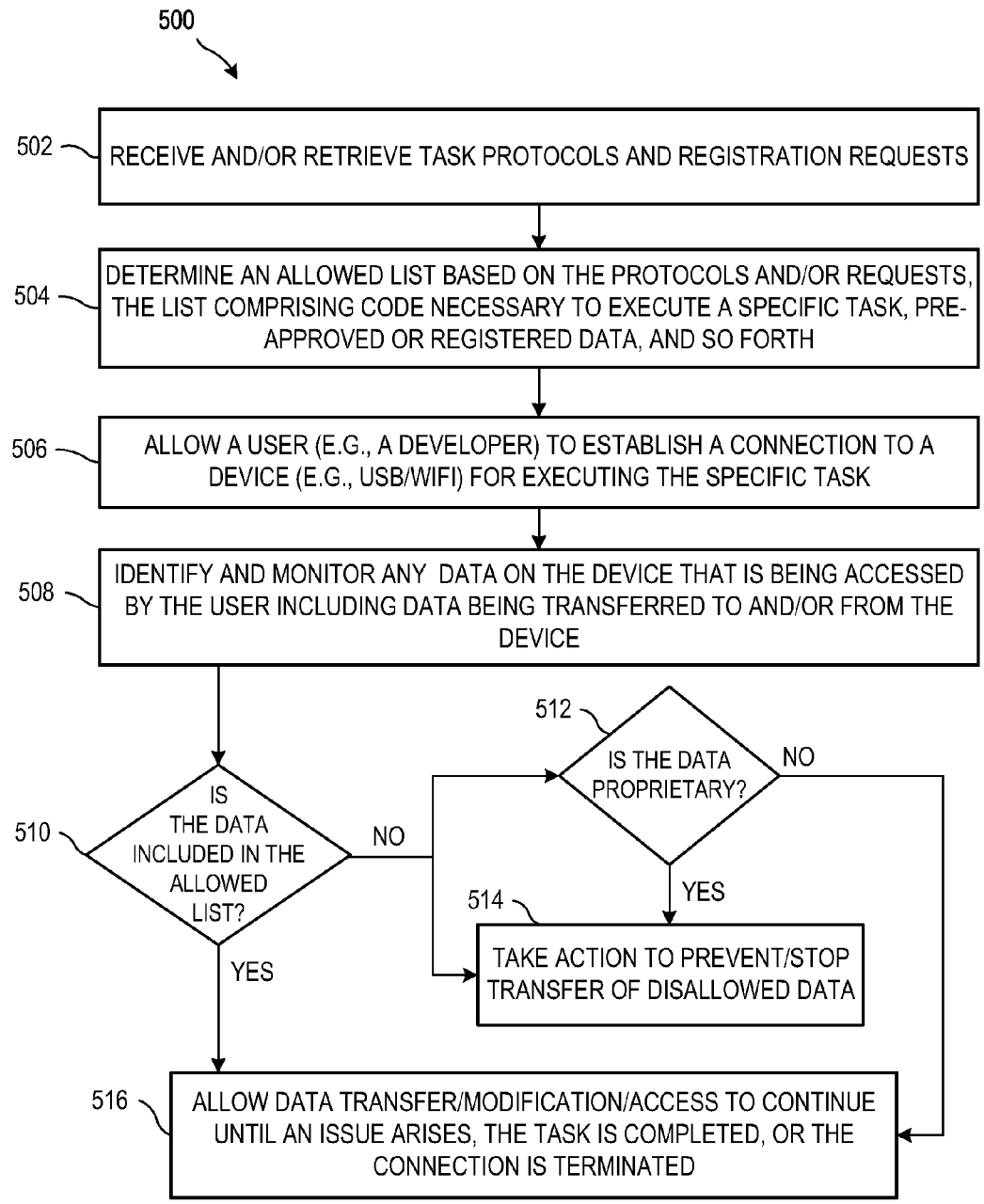
FIG. 5 is a flowchart illustrating a system and method for securing programming data in accordance with various embodiments.
Figure 6:
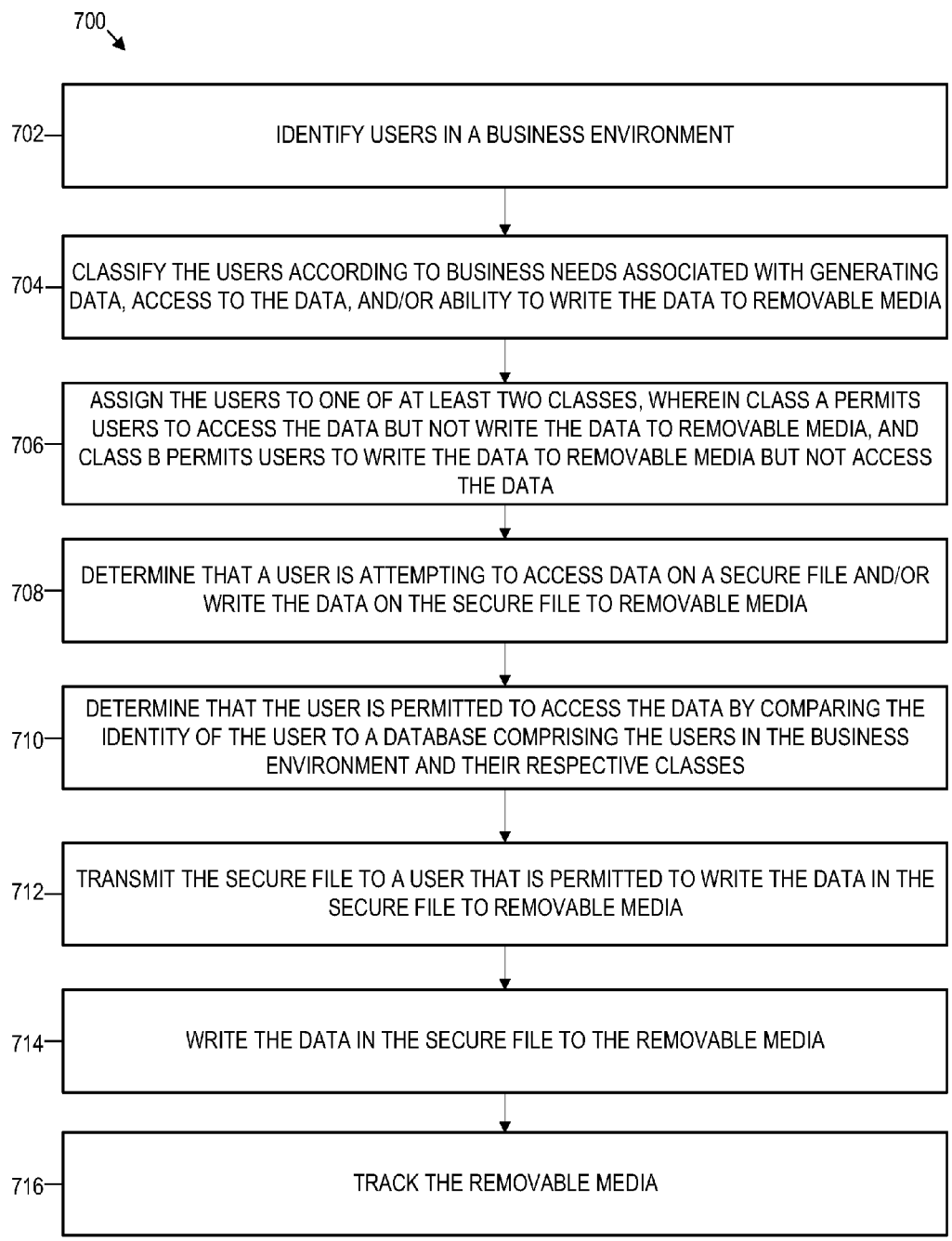
FIG. 6 is a flowchart illustrating a system and method for enhancing security in a business environment in accordance with various embodiments.

FIG. 5 illustrates a flowchart providing an overview of a process 500 for securing assess to programming data. The process 500 can include one or more steps of the processes 100, 300, and 400 discussed above. One or more devices, such as the one or more computing devices and/or one or more other computing devices and/or servers of FIG. 2, can be configured to perform one or more steps of the process 500 described below. In some embodiments, the one or more devices performing the steps are associated with a financial institution. In other embodiments, the one or more devices performing the steps are associated with a business, partner, third party, developer, employee, and/or user.

As illustrated at block 502, task protocols and registration requests are received and/or retrieved. Task protocols include parameters associated with performing tasks such as debugging, troubleshooting, small code variance, program updates, system checks, and so forth. The task protocols may be retrieved from a third party system. For example, vendors may allow the system of process 500 to retrieve the task protocols from system libraries, or the vendors may send the task protocols to the system. By gaining access to the task protocols before a task is performed, the system can anticipate what codes will be needed to perform the task and can make an informed decision as to whether unnecessary code should be blocked as discussed in more details below.

The registration requests can be received from associates, developers, managers, and other parties. The registration requests enable certain data to be pre-approved for dissemination or input. In some embodiments, associates send the registration request to a manager who reviews the request and approves all or a portion of the data in the request for pre-approval and registration. In other embodiments, the registration process is completed automatically. The system of process 500 may, for example, approve or deny registration based on established protocols that prevent confidential and proprietary data from being exposed.

The registration request includes code or other data sought to be pre-approved, and can further include additional information such as reasons for seeking registration, certifications that the data does not contain confidential information, user access limits, pre-approval time limits, and the like. For example, the registration request may include certain source code, the identity of the users to be granted permission to access the certain source code, types of data modification (copy, read only, write, and so forth) allowed for each identified user, and an allotted amount of time for performing the task. In one exemplary case, some users may be allowed to copy the data while other users may only be allowed to read the data.

As illustrated at block 504, an allowed list is determined based on the task protocols and/or the registration requests, where the list includes code necessary to execute a specific task, registered data, and so forth. The necessary task code includes code for performing specific tasks such as troubleshooting, debugging, system or program updates, patch instillations, small code variance, and so forth. The necessary task code is identified from the task protocols received or retrieved from internal sources or third parties (e.g., vendors servicing a device or systems and programs installed on the device). The registered data includes the pre-approved data discussed above. In cases where a specific task (e.g., debugging) is to be performed, the system matches the specific task from registered data stored in a registration database. In this way, the system can streamline the process by limiting the registered data to only the data pertinent to the task. In other embodiments, the system may include registered data associated with a user, the device, or programming associated with the device in the allowed list.

As illustrated at block 506, a user is allowed to establish a connection to a device in order to execute the specific task. The device includes one or more computing devices such as laptops, personal computers, notepads, gaming devices, smart phones, cell phones, other mobile devices, and the like. In the embodiment of FIG. 5, the user includes developers, technical support staff, vendors associated with the device, program specific programmers, and other third parties. In additional embodiments, the user can include any party associated with the device such as the owner of the device, an internal associate, an employee, and the like.

In some embodiments, the system includes granular permissions based on the user. For example, the needs of a developer and tester may differ. Once the user establishes a connection, in some embodiments the identity of the user is determined and the granular permissions for access to the data are determined based on the identity of the user. For example, a developer may have greater write access to limited portions of the data, while a tester may have only read access to a greater portion of the data. This access control permits different access levels for different specific and/or categories of users. In this embodiment, the granular permissions based on the user also assist the system in managing access as users change positions. For example, if a user who was once a developer switches to be a tester then the access the user has will also change based on the category of the user. This also allows the system to quickly and easily revoke access to data by changing the granular permissions associated with specific and/or categories of users.

In further embodiments, a removable device is connected to the device. For example, one or more removable devices such as a USB (universal serial bus) flash drive, external hard drive, CD, and other removable media can be connected to the device. The removable device can include a virtual container comprising a removable media.

In other embodiments, a third party system is wirelessly connected to the device. For example, a vendor system may access the device via a wireless network to conduct low level debugging.

As illustrated at block 508, any data on the device that is being accessed by the user including data being transferred to and/or from the device is identified and monitored. For example, the system of process 500 may receive connection information whenever an external removable media is mounted to the device. The system identifies the external removable media and tracks the data being accessed by the external removable media. In other cases, the system may detect wireless connections and identify the data being accessed by the third party system.

Once the connection is established, the user may only have read-only capabilities, or the user may be able to copy, add, delete, or otherwise modify data on the device depending on permissions granted to the user. Further, the user may only have access to certain portions of the data stored or otherwise associated with the device. The system of process 500 monitors all the data that is accessed, imported, or exported by the user including specific code, object level calls, and the like.

As illustrated at determination block 510, the system of process 500 determines if the identified accessed data is included in the allowed list. The system, in some embodiments, compares the necessary task codes, registered data, or other pre-approved data to the identified accessed data. Based on the comparison, the system can determine if a portion of the accessed data does not match the data of the allowed list. For example, a developer may be allowed to write code for debugging because it is in the allowed list or otherwise necessary for performing the specific task. However, details put in parenthesis such as comments on how something operates would be disallowed.

In a further embodiment, the system may include high level permissions for development, debugging, and/or operating system upgrades. For example, the system may determine that an input to the protected memory may be an operating system upgrade. The system determines this based on metadata associated with the input, based on diagnostic code included with the input, or the like. In this embodiment, the system does not conduct a lengthy review or change process but instead determines that the upgrade is on an allowed list and then permits the upgrade to occur. In some embodiments, the input includes an identifier that allows the input to pass through the protections without needing the system to be re-engineered. For example, the identifier may act as a flag or a switch that turns the protection off when the identifier is included with the input or output. In this manner, a user could override the protections by including a pre-determined identifier with the data that is passing through the system.

As illustrated at decision block 512, if it is determined that the identified accessed data is not allowable, the system of process 500 determines if the accessed data is proprietary, confidential, or otherwise impermissible. In cases where the system included only registered data associated with the specific task, user, or device in the allowed list, the system may conduct a secondary search of pre-approved data stored in the registration database to determine if the accessed data matches any of the pre-approved data. In other cases, the system conducts content searching. For example, the system may conduct content searching of the accessed data to identify government identifiers, passwords, protected data, personal information, and other data by using key words, search strings, and Boolean operators.

In some embodiments, all or pre-determined portions of the accessed data that does not match the data in the allowed list is subjected to the secondary inquiry of block 512. For example, if the specific task is time sensitive or tagged as critical, the accessed data may undergo the secondary inquiry to avoid unnecessary delays that would otherwise occur if the process 500 was terminated, or to aid in allowing the user to complete the task. In other examples, the method of access or the type of accessed data may determine whether or not the non-matching accessed data is subjected to the secondary inquiry. For example, if the data is only being read and not copied or modified, the system may allow the non-matching accessed data to continue to the next steps of the process 500. In other examples, certain types of data that are highly unlikely to contain confidential or proprietary information may be subjected to the second inquiry.

If the system determines that the accessed data is not impermissible, the process 500 continues to block 516. If the system determines that the accessed data is impermissible, the process 500 continues to block 514.

As illustrated at block 514, action is taken to prevent or stop transfer of disallowed data. Action can be taken automatically in response to determining that the accessed data does not match the data of the allowed list, or the system can further assess the accessed data as discussed above with regard to block 512.

Any number of actions can be taken to prevent or stop the transfer of the disallowed data. In some embodiments, the connection is terminated. For example, the system of process 500 may unmount the removable media from the device or sever the wireless connection. In other embodiments, the system blocks impermissible data from being accessed or modified. For example, the system may completely block off the impermissible or disallowed data from being read, copied, and modified, or the system may allow the disallowed data to be read but not copied or modified.

As illustrated at block 516, data access, data transfer, or data modification is allowed to continue until an issue arises, the task is completed, or the connection is terminated if it is determined that all of the accessed data matches the data of the allowed list or if it determined that the non-matching accessed data is permissible. Loss of power supply, command errors, or complete loss of connection may terminate the process such that the process 500 must be started over from the beginning. For example, the device may automatically shut down, data transfer may stop, or removable media may be accidentally or purposefully unmounted from the device.

In further embodiments, one or more reports are generated. The reports can include a log of the data that was transferred between the device and an external media or system, any data modification on the device, time and date the task is completed, issues arising during performance of the task, recommendations for pre-approvals for certain data, and the like. The reports can be used to make adjustments and optimize the process. For example, if certain tasks were prevented from being completed over 50% of the time because the system determined that certain types of data were not allowable, the one or more reports may recommend that the task protocols be updated or that the certain types of data be registered to avoid delays in the future.

Use of the Secure Data Application in a Business Environment

The secure files and secure data containers disclosed herein may be used in a business environment to provide additional layers of security and plausible deniability for protecting non-public personal information (NPI) data. While the secure files and the secure data containers provide opportunities for protecting data based on selective access, fingerprint analysis, and the like, a method of using the secure files and secure data containers may also provide an additional layer of security. In some embodiments, the secure endpoint file export application is integrated throughout the business environment and configured to provide different types of access to different individuals. In this manner, the business needs of individuals are met while also securing NPI data that would otherwise be made available to individuals in the business that do not need to have access to the data.

In some embodiments, the system and method are configured to identify a plurality of users in a business environment; classify the plurality of users according to business needs; assign the users to one of at least two classes based on the classification, wherein class A permits users to access the data but not write the data to removable media, and wherein class B permits users to write the data to removable media but not access the data; determine that a first user is attempting to access data on a secure file; determine that the first user is permitted to access the data on the secure file by comparing the identity of the user to a database comprising the plurality of users in the business environment and their respective classes; transmit the secure file to a second user who is permitted to write the data in the secure file to removable media; write the data in the secure file to the removable media; and track a location of the removable media.

In an embodiment, the system is configured to identify a plurality of users in a business environment, as shown in block 602. As used herein, a business environment is a for-profit business structure, a non-profit business structure, an educational structure, or a government structure. For example, a business environment may be a financial institution having a variety of employees. In another example, a business environment is a government agency having employees of different levels. In some embodiments, the business environment is the full company while in other embodiments the business environment is the employees at a specific location or the employees who are currently logged into a system. Business environments desire to provide multiple layers of security when it comes to customer data and therefore can implement the disclosed system in coordination with the functionality and devices disclosed herein.

In an embodiment, the plurality of users in the business environment are employees or other individuals associated with the business environment that may have access to customer personal data. For example, customer service representatives at a financial institution may have access to customer data in order to discuss customer accounts with the customer. Similarly, a compliance officer at a financial institution may be responsible for preparing reports for government agencies. In the example, the customer service representative may have no reason to write the customer data to a removable file and therefore would not be provided with the ability to do so. The compliance officer, however, may have the need to write data to a removable media so that the data can be sent to the government agency. The financial institution, however, may desire to separate the preparation of the report by the compliance officer and the writing of the report to the removable media so that a single individual isn't responsible for both preparing and sharing the data.

As discussed, the plurality of individuals may be identified based on employment records in the business environment. In some embodiments, all employees of a business are identified via a database. In further embodiments, the plurality of individuals are identified based on determining individuals that have logged into a security system, such as the secure endpoint file export application. In this manner, the plurality of individuals are identified and also subject to the restrictions of the secure endpoint file export application.

In an embodiment, the plurality of individuals is updated on a regular basis. For example, the plurality of individuals may be identified daily to identify new employees or determine that previous employees have left the business environment. In some embodiments, the plurality of individuals is updated in real-time based on individuals logged into the secure endpoint file export application.

In some embodiments, the system classifies the users according to business needs, as shown in block 604. In an embodiment, the business needs are associated with generating data, access to the data, and/or the ability to write the data to removable media. Classifying users according to business needs relates to the concept of efficiency of data management. For example, some businesses prefer to separate the ability of employees to access and/or write personal data to removable media. Some employees may only need access to personal data. Other employees may require the ability to write personal data or other types of data to removable media but do not require access to the data. Still further, some employees may require both access and the ability to write the data to removable media. The application and hardware disclosed herein permits businesses to identify users, classify the users according to business needs, and operate a system that increases security for customer personal data.

In some embodiments, the system classifies the users based on job description. For example, customer service representatives may be classified into a one category that provides access but no ability to write customer data. A CEO may be classified into a category that provides access and the ability to write customer data. A physical media team member may be classified into a category that has the ability to write customer data to removable media but not access or view the data. In further embodiments, the application may have a class for users that can access customer data but not edit the customer data or write the customer data to removable media.

For example, in one embodiment the system assigns the users to one of at least two classes based on the classification, as shown in block 606. In some embodiments, a first class, termed "class A," permits users to access the data but not write the data to removable media. In further embodiments, a second class, termed "class B," permits users to write the data to removable media but not access the data.

The secure endpoint file export application may have a variety of classes that users can be assigned to. For example, a class "C" that permits both access and writing ability may be designated by the system. Similarly, additional classes have combination of access, edit, and write permissions may be generated by the system.

In an embodiment, the system assigns classes to the users based on the user's type of employment (e.g., assigned tasks) and/or by the needs of the business. For example, some users in the system may be multipurpose employees that can write data to files or access files. The system can evaluate the needs of the business and dynamically assign users to one or more classes based on the needs of the business. In this example, if a business has a high level of customer information requests more individuals having access to customer data may be assigned to handle the requests.

In some embodiments, the system determines that a user is attempting to access data on a secure file and/or write the data on the secure file to removable media, as shown in block 608. In an embodiment, the user is one of the plurality of users identified by the system previously. In some embodiments, however, the user is a new user and will be assigned a category prior to evaluating whether the user is permitted to access and/or write the data.

As discussed herein, access means being able to view the data stored in the secure file. For example, access to data may mean that a user can open up a file and view the data stored therein. In some embodiments, the access to the data is permitted via the secure endpoint file export application. In this embodiment, the data is viewed through a program accessible through the application. In other embodiments, the data is viewed through a program that is not associated with the secure endpoint file export application. For example, a native document viewing application may be used to view data stored in a document. The access is restricted, meaning that the native document viewing application may not be able to view the data if the user is not assigned to the proper category.

In some embodiments, the data is stored in a secure file. In an embodiment, a secure file is a software embodiment that provides restrictions on use for the data stored therein. The secure file is generated by the secure endpoint file export application and assists in implementing the system and method disclosed herein. For example, the secure file may have access restrictions that only permit access by users assigned to a specific category. In an embodiment, access to the data means being capable of both viewing and editing the data. In a further embodiment, access to the data means only being able to view the data and further permissions must be established by the program, such as via a new category, that permit writing to the data in the secure file.

In an embodiment, restrictions on who may write data to removable media are important in order to secure the media within the business organization. Writing data to removable media may comprise a variety of means by which users can copy the data. For example, writing data may include copy and pasting the data into an email, instant message, or file. In some embodiments, writing data to removable media includes copying a file without opening the file. In further embodiments, writing data to removable media includes transferring the data over a network connection, similar to various file transfer protocols.

As used herein, removable media includes storage devices comprising memory that are capable of storing the secure file. For example, the removable media may include USB drives, CDs, DVDs, other types of removable memory, and the like. In some embodiments, removable media refers to a hardware device that can wirelessly transmit and store data. For example, a mobile device such as a smartphone may include memory and a wireless transmitter (e.g., Bluetooth, NFC, or the like) that can transfer data wirelessly from a data source to the mobile device.

In an embodiment, the system determines that the user is permitted to access the data by comparing the identity of the user to a database comprising the users in the business environment and their respective classes, as shown in block 610. In an embodiment, the system determines the identity of the user based on a user login or other means by which the user gains access to the system. For example, a specific computer may be assigned to a user, a user login may be associated with the user, or a user may have an access card to begin using a computing device.

In an embodiment, the system compares the identity of the user to a database and users and associated classes in a database. The database may be stored locally with the system or stored remotely from the system. In an embodiment, the database is updated as new users are added or as users are assigned different classes.

In some embodiments, the system transmits the secure file to a user that is permitted to write the data in the secure file to removable media, as shown at block 612. In an embodiment, the system permits access to the data on the secure file to a user that is permitted to access the secure data. For example, an individual responsible for preparing compliance reports for federal agencies may generate and edit a file comprising the report. The system evaluates the identity of the user, determines that the user is permitted to generate, access, and/or edit the report, but that the user is not permitted to write the data to a removable media to send to the federal agency. The system sends the file to a second user that is authorized to write the data to a removable media, such as a member of a central enterprise physical media team. In some embodiments, the system sends the file to the second user in response to a request by the first use or the second user. In some embodiments, the system sends the file to the second user in response to an external request, such as from the federal agency. In still further embodiments, the system sends the request to the second user on a schedule, such as a quarterly report deadline or the like.

In an embodiment, the system writes the data in the secure file to the removable media, as shown in block 614. In an embodiment, the system writes the data in the secure file to the removable storage in response to a request by the second user. In some embodiments, the system writes the data to the removable storage so that the data can then be sent to an external party. In an embodiment, the separation of the access to the data and ability to write the data results in greater security for the customer data. In some embodiments, the removable media comprises a secure media container as discussed herein.

In further embodiments, the system tracks the removable media, as shown in block 616. In some embodiments, the removable media comprises a transceiver that is controlled by the application and/or the secure file. For example, the removable media may periodically or continuously track the location of the removable media and report the location to the secure endpoint file export application. As discussed herein, the system may be configured to erase or destroy the data and/or secure media container if the location of the removable media is outside of a predetermined radius of a set location or a plurality of locations. In some embodiments, the system erases the data if the data is outside of the predetermined radius and a specific condition occurs, such as a period of time outside of the radius is reached, the file is accessed or access is attempted, or the removable media receives a remote message from a user instructing that the data be erased.

Figure 7:
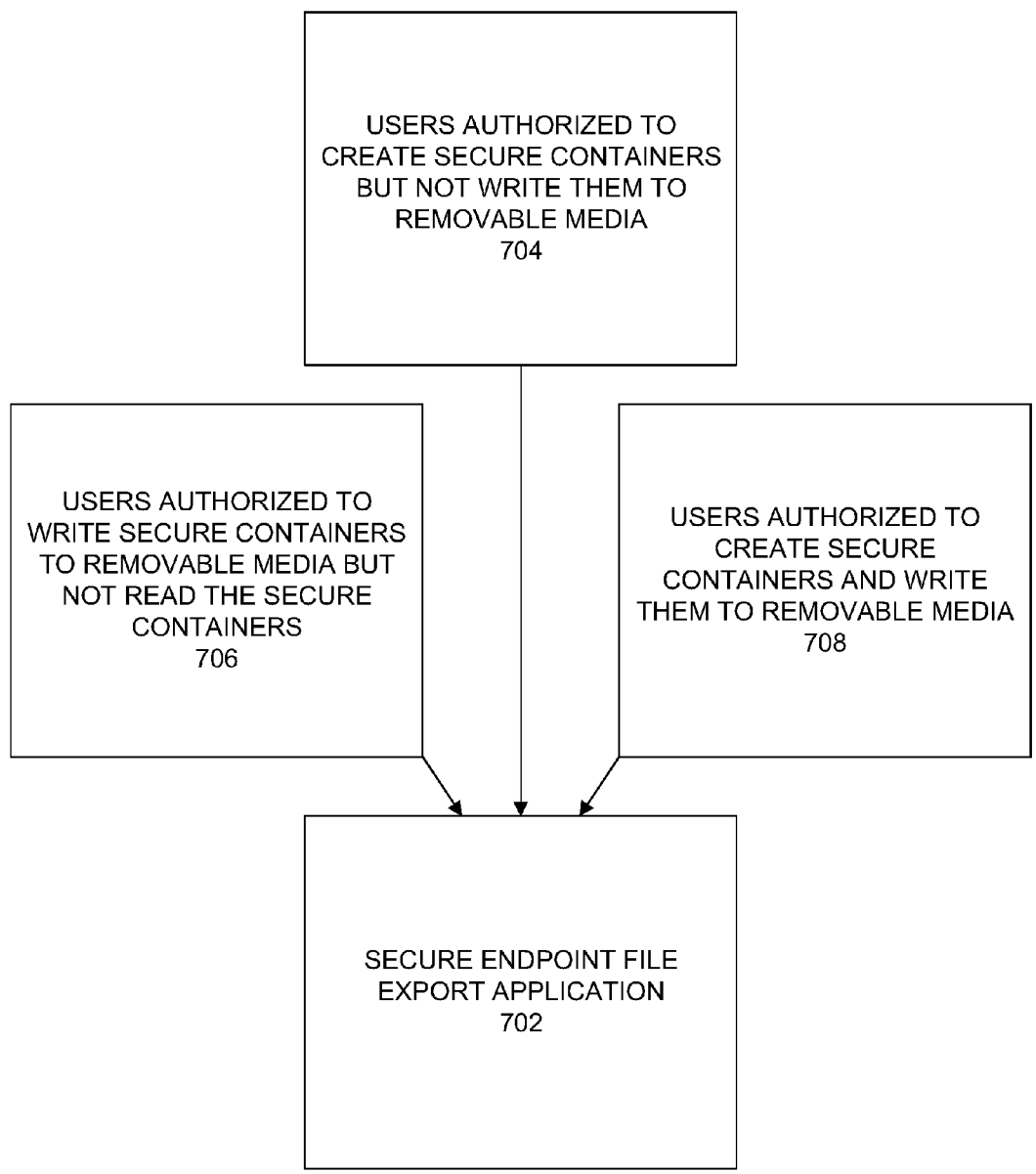
FIG. 7 is a diagrammatic representation of users and classes relating to the secure endpoint file export application in accordance with various embodiments.

Turning now to FIG. 7, a diagrammatic representation of different classes of users as they relate to the secure endpoint file export application is provided, in accordance with an embodiment of this disclosure. In some embodiments, the secure endpoint file export application 702 is implemented via specific hardware and software that not only provides software functionality but also implements the hardware functionality described herein, e.g., tracking, locking, and the like. In some embodiments, the secure endpoint file export application 702 is a base-level application through which other applications are run. For example, access to databases may be implemented through the application 702 so that restrictions on access by user category can be maintained.

In an embodiment, at least two classes of users are identified and maintained by the secure endpoint file export application 702. In one embodiment, the majority of users in a business environment are class A 704, meaning that they can access data but cannot write the data to removable media. Often employees of a business may need access to data but do not have a business need for transmitting the data outside of the business, thus restricting write ability protects the data from inadvertent disclosure. In an embodiment, the business environment also includes a central enterprise physical media team in class B 706, meaning that they are tasked with writing data to removable media but do not have a need to view the data. By separating the access and write abilities of users, the institution is providing greater security for the customer data. In some embodiments, some users (e.g., a small percentage) are power users 708 that have both access and write ability. Users such as administrators or high level executives may have both access and write ability. As discussed, the system may further divide classes by separating edit and read ability within access such that some users can edit the files while others can only read the files.

The flowcharts and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of embodiments of the disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or teams thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to embodiments of the disclosure in the form disclosed. Many modifications and variations will be apparent to those of ordinary skill in the art without departing from the scope and spirit of embodiments of the disclosure. The embodiment was chosen and described in order to best explain the principles of embodiments of the disclosure and the practical application, and to enable others of ordinary skill in the art to understand embodiments of the disclosure for various embodiments with various modifications as are suited to the particular use contemplated. Although specific embodiments have been illustrated and described herein, those of ordinary skill in the art appreciate that any arrangement which is calculated to achieve the same purpose may be substituted for the specific embodiments shown and that embodiments of the disclosure have other applications in other environments. This application is intended to cover any adaptations or variations of the present disclosure. The following claims are in no way intended to limit the scope of embodiments of the disclosure to the specific embodiments described herein.

What is claimed is:

1. A system for preventing data loss in a business environment, whereby a secure endpoint file export application assigns users to different classes having different permissions for accessing and writing data, the system comprising:
   a computer apparatus including a processor and a memory; and
   a secure endpoint file export application stored in the memory, comprising executable instructions that when executed by the processor cause the processor to:
   identify a plurality of users in a business environment;
   classify the plurality of users according to business needs;
   assign the users to one of at least two classes based on the classification,
     wherein class A permits users to access the data but not write the data to removable media, and
     wherein class B permits users to write the data to removable media but not access the data;
   determine that a first user is attempting to access data on a secure file;
   determine that the first user is permitted to access the data on the secure file by comparing the identity of the user to a database comprising the plurality of users in the business environment and their respective classes;
   transmit the secure file to a second user who is permitted to write the data in the secure file to removable media;
   write the data in the secure file to the removable media;
   track a location of the removable media, wherein tracking the location of the removable media comprises receiving a wireless signal from the removable media, and tracking the location of the removable media based on the wireless signal;
   monitor the location of the removable media; and
   erase the data from the removable media if a condition is met, wherein the condition is selected from the group consisting of a predetermined period of time outside a predetermined radius from a permitted location, detection of unauthorized access to the removable media, and receiving instructions from the secure endpoint file export application to erase the removable media.

2. The system of claim 1, wherein the executable instructions further cause the processor to:
   identify the first user based on a login used to access a computing device.

3. The system of claim 1, wherein the executable instructions further cause the processor to:
   monitor the plurality of users logged into the secure endpoint file export application; and
   assign the users to a class as the users logged into the secure endpoint file export application change.

4. The system of claim 1, wherein the executable instructions further cause the processor to:
   determine a predetermined schedule for writing the data to the removable media; and
   send the data from the first user to the second user based upon the predetermined schedule.

5. The system of claim 1, wherein the classes comprise a third class that permits both access to the data and the ability to write the data to the removable media.

6. A computer program product for preventing data loss in a business environment, whereby a secure endpoint file export application assigns users to different classes having different permissions for accessing and writing data, the computer program product comprising:
   a non-transitory computer readable storage medium having computer readable program code embodied therewith, the computer readable program code comprising:
     computer readable program code configured to identify a plurality of users in a business environment;
     computer readable program code configured to classify the plurality of users according to business needs;
     computer readable program code configured to assign the users to one of at least two classes based on the classification,
       wherein class A permits users to access the data but not write the data to removable media, and
       wherein class B permits users to write the data to removable media but not access the data;
     computer readable program code configured to determine that a first user is attempting to access data on a secure file;
     computer readable program code configured to determine that the first user is permitted to access the data on the secure file by comparing the identity of the user to a database comprising the plurality of users in the business environment and their respective classes;
     computer readable program code configured to transmit the secure file to a second user who is permitted to write the data in the secure file to removable media;
     computer readable program code configured to write the data in the secure file to the removable media;
     computer readable program code configured to track a location of the removable media, wherein tracking the location of the removable media comprises receiving a wireless signal from the removable media, and tracking the location of the removable media based on the wireless signal;

computer readable program code configured to monitor the location of the removable media; and computer readable program code configured to erase the data from the removable media if a condition is met, wherein the condition is selected from the group consisting of a predetermined period of time outside a predetermined radius from a permitted location, detection of unauthorized access to the removable media, and receiving instructions from the secure endpoint file export application to erase the removable media.

7. The computer program product of claim 6, wherein the computer readable program code further comprises:

computer readable program code configured to identify the first user based on a login used to access a computing device.

8. The computer program product of claim 6, wherein the computer readable program code further comprises:

computer readable program code configured to monitor the plurality of users logged into the secure endpoint file export application; and computer readable program code configured to assign the users to a class as the users logged into the secure endpoint file export application change.

9. The computer program product of claim 6, wherein the computer readable program code further comprises:

computer readable program code configured to determine a predetermined schedule for writing the data to the removable media; and computer readable program code configured to send the data from the first user to the second user based upon the predetermined schedule.

10. The computer program product of claim 6, wherein the classes comprise a third class that permits both access to the data and the ability to write the data to the removable media.

11. A computer-implemented method for preventing data loss in a business environment, whereby a secure endpoint file export application assigns users to different classes having different permissions for accessing and writing data, the method comprising:

identifying a plurality of users in a business environment;

classifying the plurality of users according to business needs;

assigning, via a computing device processor, the users to one of at least two classes based on the classification, wherein class A permits users to access the data but not write the data to removable media, and wherein class B permits users to write the data to removable media but not access the data;

determining that a first user is attempting to access data on a secure file;

determining that the first user is permitted to access the data on the secure file by comparing the identity of the user to a database comprising the plurality of users in the business environment and their respective classes;

transmitting the secure file to a second user who is permitted to write the data in the secure file to removable media;

writing the data in the secure file to the removable media;

tracking a location of the removable media, wherein tracking the location of the removable media comprises receiving a wireless signal from the removable media, and tracking the location of the removable media based on the wireless signal;

monitoring the location of the removable media; and erasing the data from the removable media if a condition is met, wherein the condition is selected from the group consisting of a predetermined period of time outside a predetermined radius from a permitted location, detection of unauthorized access to the removable media, and receiving instructions from the secure endpoint file export application to erase the removable media.

12. The computer-implemented method of claim 11, further comprising:

identifying the first user based on a login used to access a computing device.

13. The computer-implemented method of claim 11, further comprising:

monitoring the plurality of users logged into the secure endpoint file export application; and assigning the users to a class as the users logged into the secure endpoint file export application change.

14. The computer-implemented method of claim 11, further comprising:

determining a predetermined schedule for writing the data to the removable media; and sending the data from the first user to the second user based upon the predetermined schedule.

* * * * *